(12) United States Patent
Liu

(10) Patent No.: US 10,916,261 B1
(45) Date of Patent: Feb. 9, 2021

(54) TRUE ONE TURN (T1T) PERPENDICULAR MAGNETIC RECORDING (PMR) WRITER DESIGNS

(71) Applicant: Headway Technologies, Inc., Milpitas, CA (US)

(72) Inventor: Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/672,970

(22) Filed: Nov. 4, 2019

(51) Int. Cl.
| G11B 5/17 | (2006.01) |
| G11B 5/127 | (2006.01) |
| G11B 5/39 | (2006.01) |
| G11B 5/48 | (2006.01) |
| G11B 5/00 | (2006.01) |
| G11B 5/60 | (2006.01) |

(52) U.S. Cl.
CPC ............. G11B 5/1278 (2013.01); G11B 5/17 (2013.01); G11B 5/3912 (2013.01); G11B 5/3922 (2013.01); G11B 5/4833 (2013.01); *G11B 5/607* (2013.01); *G11B 2005/0032* (2013.01)

(58) Field of Classification Search
None
See application file for complete search history.

(56) References Cited

U.S. PATENT DOCUMENTS

| 6,353,511 | B1 | 3/2002 | Shi et al. |
| 6,665,136 | B2 | 12/2003 | Clinton et al. |
| 7,113,367 | B2 | 9/2006 | Yazawa et al. |
| 7,268,974 | B2 | 9/2007 | Lille |
| 7,907,360 | B2 | 3/2011 | Mak et al. |
| 7,952,831 | B2 | 5/2011 | Kim et al. |
| 8,089,723 | B2 | 1/2012 | Schabes |
| 8,111,479 | B2 | 2/2012 | Chen et al. |
| 8,218,264 | B1 | 7/2012 | Sasaki et al. |
| 8,264,792 | B2 * | 9/2012 | Bai ..................... G11B 5/1278 360/125.07 |

(Continued)

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

(Continued)

*Primary Examiner* — William J Klimowicz
(74) *Attorney, Agent, or Firm* — Saile Ackerman LLC; Stephen B. Ackerman

(57) ABSTRACT

A PMR writer with a true one turn design is disclosed with a driving coil above the main pole (MP) but where a bucking coil below the MP is replaced by a dummy metal layer or fully removed to substantially enhance the return field to the trailing shield. A non-double write shield scheme is employed where the leading loop for magnetic flux return is terminated at the leading shield. A tapered bottom yoke (tBY) contacts the MP bottom surface and has a tapered front side at height tBYd from the air bearing surface. Bottom yoke (BY) is below the tBY and has a front side at height BYd where BYd>tBYd. Reader-writer separation is reduced by 1-2 microns when the bucking coil is fully removed. Wide adjacent track erasures are controlled with a high damping material in one or more of the leading, side and trailing shields.

16 Claims, 10 Drawing Sheets

(56) References Cited

U.S. PATENT DOCUMENTS

| | | |
|---|---|---|
| 8,274,758 B2 | 9/2012 | Wu et al. |
| 8,284,516 B1 | 10/2012 | Tang et al. |
| 8,347,489 B2 | 1/2013 | Hong et al. |
| 8,427,781 B1 | 4/2013 | Sasaki et al. |
| 8,462,461 B2 | 6/2013 | Braganca et al. |
| 8,542,461 B2 | 9/2013 | Bai et al. |
| 8,582,238 B1 | 11/2013 | Liu et al. |
| 8,582,241 B1 | 11/2013 | Yu et al. |
| 8,749,919 B2 | 6/2014 | Sasaki et al. |
| 8,810,764 B2 | 8/2014 | Nishida et al. |
| 8,828,248 B2 | 9/2014 | Mao et al. |
| 8,836,059 B2 | 9/2014 | Ahn et al. |
| 8,867,168 B2 | 10/2014 | Ota et al. |
| 8,879,208 B1 | 11/2014 | Liu et al. |
| 9,082,433 B1 | 7/2015 | Tang et al. |
| 9,171,561 B1 | 10/2015 | Gadbois et al. |
| 9,361,912 B1 | 6/2016 | Liu et al. |
| 9,387,568 B1 | 7/2016 | Ilaw et al. |
| 9,466,319 B1 | 10/2016 | Tang et al. |
| 9,495,980 B1 * | 11/2016 | Sasaki .................. G11B 5/1278 |
| 9,508,364 B1 * | 11/2016 | Tang ....................... G11B 5/112 |
| 9,613,642 B1 | 4/2017 | Erden et al. |
| 9,697,855 B1 | 7/2017 | Liu et al. |
| 9,754,612 B2 | 9/2017 | Wei et al. |
| 9,805,744 B1 | 10/2017 | Xue et al. |
| 10,014,021 B1 * | 7/2018 | Liu .......................... G11B 5/31 |
| 10,032,469 B2 | 7/2018 | Lim et al. |
| 10,311,900 B1 | 6/2019 | Liu et al. |
| 10,366,713 B1 | 7/2019 | Tang et al. |
| 10,418,054 B1 * | 9/2019 | Liu ........................ G11B 5/315 |
| 2006/0145721 A1 | 7/2006 | Ton-Churo |
| 2007/0171575 A1 | 7/2007 | Lim et al. |
| 2009/0067098 A1 * | 3/2009 | Kim .................... G11B 5/1278 360/313 |
| 2010/0007986 A1 | 1/2010 | Mak et al. |
| 2010/0277832 A1 * | 11/2010 | Bai ....................... G11B 5/3163 360/125.03 |
| 2012/0050915 A1 | 3/2012 | Hong et al. |
| 2012/0050921 A1 | 3/2012 | Marshall |
| 2013/0027809 A1 | 1/2013 | Min et al. |
| 2013/0335847 A1 | 12/2013 | Shiroishi |
| 2016/0254014 A1 | 9/2016 | Biskeborn et al. |
| 2017/0256275 A1 | 9/2017 | Hutchinson et al. |
| 2018/0330748 A1 * | 11/2018 | Liu ........................ G11B 5/315 |
| 2019/0304490 A1 | 10/2019 | Liu et al. |

OTHER PUBLICATIONS

"Effect of 3d, 4d, and 5d transition metal doping on damping in permalloy thin films," by J. O. Rantschler et al., Journal of Applied Physics 101, 033911, Feb. 14, 2007, pp. 1-5.

"Micromagnetic Analysis of Adjacent Track Erasure of Wrapped-Around Shielded PMR Writers," by Suping Song et al., IEEE Transactions on Magnetics, vol. 45, No. 10, Oct. 2009, pp. 3730-3732.

"Characterization of Adjacent Track Erasure in Perpendicular Recording by a Stationary Footprint Technique," by Yuhui Tang et al., IEEE Transactions on Magnetics, vol. 49, No. 2, Feb. 2013, pp. 744-750.

"Magnetic Damping in Ferromagnetic Thin Films," by Mikihiko Oogane et al., Japanese Journal of Applied Physics, vol. 45, No. 5A, May 9, 2006, pp. 3889-3891.

* cited by examiner

TRUE ONE TURN (T1T) PERPENDICULAR MAGNETIC RECORDING (PMR) WRITER DESIGNS

RELATED PATENT APPLICATIONS

This application is related to the following: U.S. Pat. Nos. 9,466,319; 9,990,942; 10,014,021; Ser. No. 15/913,167, filing date Mar. 6, 2018; and Ser. No. 16/254,755, filing date Jan. 23, 2019; which are assigned to a common assignee and herein incorporated by reference in their entirety.

TECHNICAL FIELD

The present disclosure relates to a PMR write head configured to have a true one turn (T1T) coil design where the lower (bucking) coil is either removed from conventional (1+1T) designs to reduce reader-writer separation (RWS), or designed to be a dummy metal layer, and that is compatible with a non-dual write shield (n-DWS) base writer structure, and where the top yoke has an optional extension below the driving coil, and a bottom yoke (BY) is added below the tapered bottom yoke (tBY) to enable a faster writer that can pick a lower Iw-peak (0 to peak current) also known as Iw0-pk at outer diameter (OD) operation than current 1.75 terabytes per platter (TBPP) 1+1T designs, and provide faster saturation speed and improved high data rate (HDR) performance without a wide adjacent track erasure (WATE) tradeoff.

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole (MP) through two pathways including a trailing loop and a leading loop. The trailing loop is comprised of a trailing shield structure (TH1) with a front side at the ABS, and an uppermost (PP3) trailing shield that may be recessed from the ABS and arches over the driving coil to connect with a top yoke (TY). In some designs, the PP3 trailing shield is exposed at the ABS for fewer process steps when WATE from PP3 and PP3 to TH1 is manageable, and a larger metal surface is exposed at the ABS to satisfy thermo-mechanical (T/M) requirements. The TY adjoins a top surface of the MP above a back gap connection (BGC). The trailing loop is also known as the top driving loop and delivers magnetic flux to the MP tip to write positive and negative field into magnetic media. The leading loop has a leading shield with a side at the ABS and in some schemes is connected to a return path (RTP) having a front side recessed from the ABS. The RTP extends back to the BGC and enables magnetic flux in the leading loop pathway to return from the leading shield at the ABS and through the BGC to the MP.

Dual write shield (DWS) designs that feature complete leading and trailing loops were invented for faster saturation speed and better WATE by reducing stray field in side shields and in the leading shield and trailing shields. However, a non-DWS (nDWS) design where essentially all of the leading loop is removed except for the leading shield has proven beneficial in providing a better return field at the MP trailing edge thereby improving field gradient, BER, and ADC compared with a DWS scheme. With the growing demand for cloud storage and cloud-based network computing, high and ultra high data rate recording becomes important for high-end disk drive applications.

To achieve areal density in a hard disk drive (HDD) beyond 2 TBPP for conventional PMR in near line applications, OD high data rate (HDR) performance up to 3.4 gigabytes per second (Gbps) or 1.7 gigahertz (GHz) is essential and critical. A one turn coil design (1+1T) with one turn in each of the bucking and driving coils has demonstrated better HDR performance than a two turn coil design (1+1+2T or 2+2T) because of less electrical inductance and more compact magnetic loop with shorter yoke length (YL). Magneto-motive force (MMF) of a one turn coil design is half that of a 2+2T design. Under direct current (DC) or low frequency alternating current (AC) applications, a one turn coil writer requires two times the current of a two turn coil writer to drive a head to the same magnetic field level. However, under high frequency for HDR applications, the 1+1T design has demonstrated an advantage in reaching the same magnetic field level with 1.2-1.5 times the current of a two turn coil design for 1.75 TBPP applications with a data rate up to 3.1 Gbps (1.55 GHz). An improved 1+1T design was disclosed in related application Ser. No. 16/254,755 with an ultimate double yoke (uDY) for the top yoke and with multiple base writer schemes that deliver a faster writer with a lower Iw0-pk at outer diameter (OD) operation. However, faster saturation speed and improved HDR performance are still needed.

SUMMARY

One objective of the present disclosure is to provide a PMR writer with a true one turn coil layout that enables faster saturation speed and better HDR performance compared with existing 1.75 TBPP 1+1T designs.

Another objective of the present disclosure is to provide a PMR writer according to the first objective that requires fewer process steps, and reduces reader-writer separation (RWS) compared with prior art 1+1T designs.

A third objective of the present disclosure is to provide a method of fabricating a PMR writer that satisfies the first two objectives.

These objectives are achieved by configuring a PMR writer having a T1T coil design wherein the top yoke (TY) is optionally extended with a TY extension forward from a TY front side (at a height corresponding to the inner corner of the PP3 trailing shield) towards the ABS, and below the top (driving) coil that is the only coil in the writer. The TY/TY extension forms a so-called ultimate double yoke (uDY). Preferably, the TY extension has a down-track thickness equal to that of the TY back portion that is below the PP3 trailing shield, and has a yoke length (YL) of 2 to 2.6 microns from the ABS to the TY front side. The TY extension front side is recessed to a height (TYd) that is 0.9-1.3 microns from the ABS, and is separated from a backside of the second trailing shield (TS) also known as the write shield (WS) by a dielectric layer. In a preferred embodiment, the PP3 TS has a dome shape with an apex angle $\theta$ from 60 degrees to 80 degrees. The writer structure is not limited to a single PMR writer, but may also be incorporated in each writer of a selectable dual writer (SDW), or in each writer of a selectable triple writer (STW). Writers in the SDW or STW schemes may have shared PP3 TS, WS, side shields (SS), and leading shields (LS), but a separate first TS (hot seed layer), TY/TY extensions, MP, tapered bottom yokes, and bottom yokes. The "selectable" aspect of a SDW or STW relates to selectively activating the writer with the better/best performance while the one or more other writers remain inactive during a write process.

The T1T scheme further comprises a tapered bottom yoke (tBY) wherein a top end of a tapered front side is recessed to a height (tBYd) of 0.4-0.8 microns from the ABS, has a thickness from 0.2-0.6 microns, and adjoins a leading side (bottom surface) of the MP. The tBY is made of a 24 kiloGauss (kG) material and may be plated at the same time as the MP. In addition, there is a bottom yoke (BY) that contacts the bottom surface of the tBY, and that is made of a 12 kG high damping (HD) material, or a 16-24 kG material. The BY has a front side recessed to a height (BYd) of 0.8-1.2 microns from the ABS, and has a thickness of 0.7-1 micron. The base writer structure preferably has a nDWS design wherein the leading loop terminates at the leading shield at the ABS. The lower (bucking) coil may be a dummy metal layer or is fully removed. For the case that the lower (bucking) coil is fully removed, RWS may be reduced from about 5 microns in 1+1T designs to 3-4 microns in one embodiment of the present disclosure.

Since the bottom (bucking) coil is either ineffective (dummy) or fully removed in T1T, the return field to the trailing loop is greatly enhanced. The return field to the trailing shields may be optimized for enhanced ADC from improved bits per inch (BPI) capability without compromising tracks per inch (TPI) performance by selecting a LS material made of a HD material and having a magnetization x saturation (Ms) from 4 kG to 12 kG. Moreover, the LS thickness is maintained from 0.15 micron to 1 micron, and LS height is from 0.15 micron to 0.35 micron.

In some embodiments, the tBY and BY each have backsides at a first height from the ABS, and a heater element in the writer is formed in an insulation layer that is below the BY or behind the BY. In an alternative embodiment, the BY has a backside at a second height greater than the first height of the tBY, and the heater element is formed in an insulation layer that is below a back portion of the BY.

The present disclosure also encompasses a method for fabricating the PMR writer with the T1T coil design according to an embodiment described previously. The process flow comprises forming a BY in a first insulation layer. A bottom portion of the LS is plated at the eventual ABS plane, and a second insulation layer is deposited on the first insulation layer, and behind the LS. A top portion of the LS (LET layer) is deposited and has a taper angle determined with an ion beam etch (IBE) step. After the side shields are plated, a reactive ion etch (RIE) process is performed to form an opening with tapered sidewalls that exposes the BY top surface. A gap layer is deposited on the LET and side shields. Then, another IBE step is used to selectively remove the gap layer on the BY top surface. Thereafter, the tapered BY and MP are simultaneously plated on the BY top surface, top surface of the second insulation layer, and on the gap layer on the LET and side shields. Next, a series of steps previously described in related application Ser. No. 16/254, 755 may be employed to form a uDY and trailing shield structure.

BRIEF DESCRIPTION OF THE DRAWINGS

FIG. 7 is a down-track cross-sectional view of a PMR writer according to a second embodiment of the present disclosure where the dummy coil in FIG. 6A is removed and a heater element is formed in an insulation layer below the BY.

FIG. 8 is a down-track cross-sectional view of a PMR writer according to a third embodiment of the present disclosure where the BY backside in FIG. 7 is extended to a height h2 where h2>height h of the tBY backside, and the heater element is formed in an insulation layer below a back portion of the BY.

DETAILED DESCRIPTION

Figure 1:
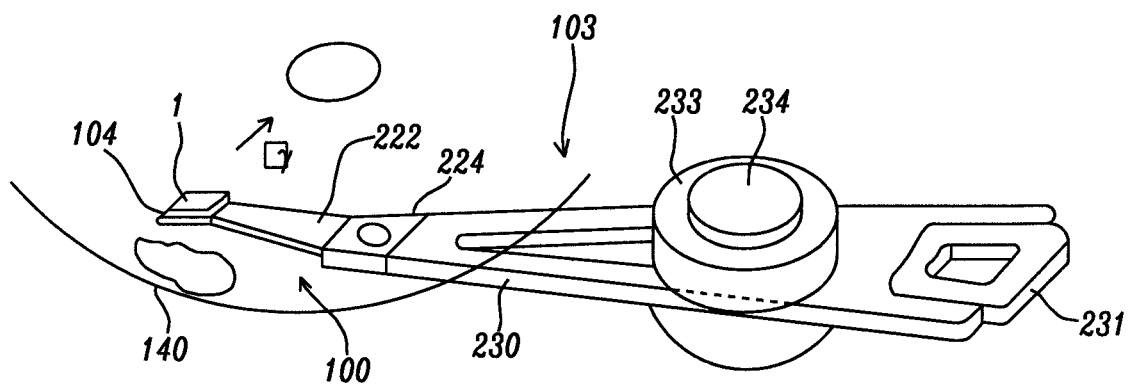
FIG. 1 is a perspective view of a head arm assembly of the present disclosure.

The present disclosure relates to a PMR writer having a T1T coil design where the bottom coil in a 1+1T scheme is either replaced by a dummy bottom coil (metal layer) or is fully removed, and a bottom yoke (BY) is added below a tapered bottom yoke in nDWS base writer structure. An ultimate double yoke (uDY) design may be employed as the top yoke (TY). In the drawings, the y-axis is a cross-track direction, the z-axis is a down-track direction, and the x-axis is in a direction orthogonal to the ABS and towards a back end of the device. Dimensions of writer components are expressed as a width in the y-axis direction, height in the x-axis direction, and thickness in the z-axis direction. The term "front side" is defined as the side of a layer that faces the ABS or is at the ABS while a "backside" is a side facing away from the ABS.

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
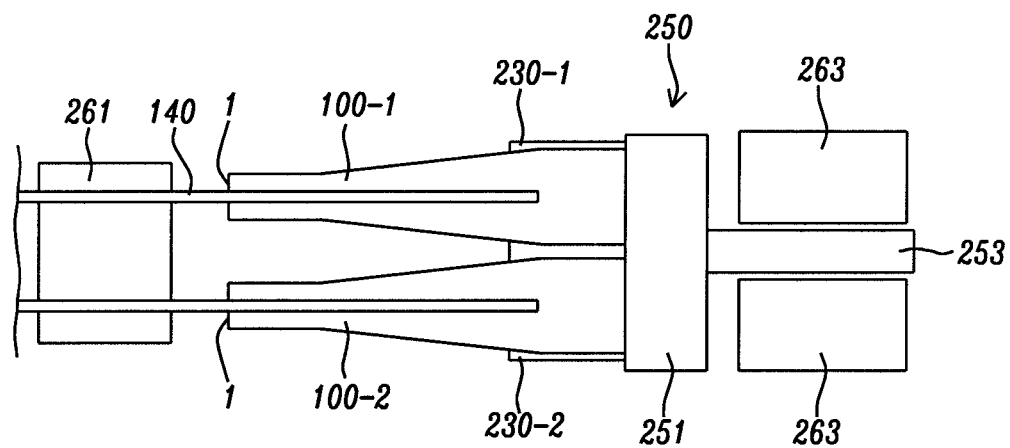
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
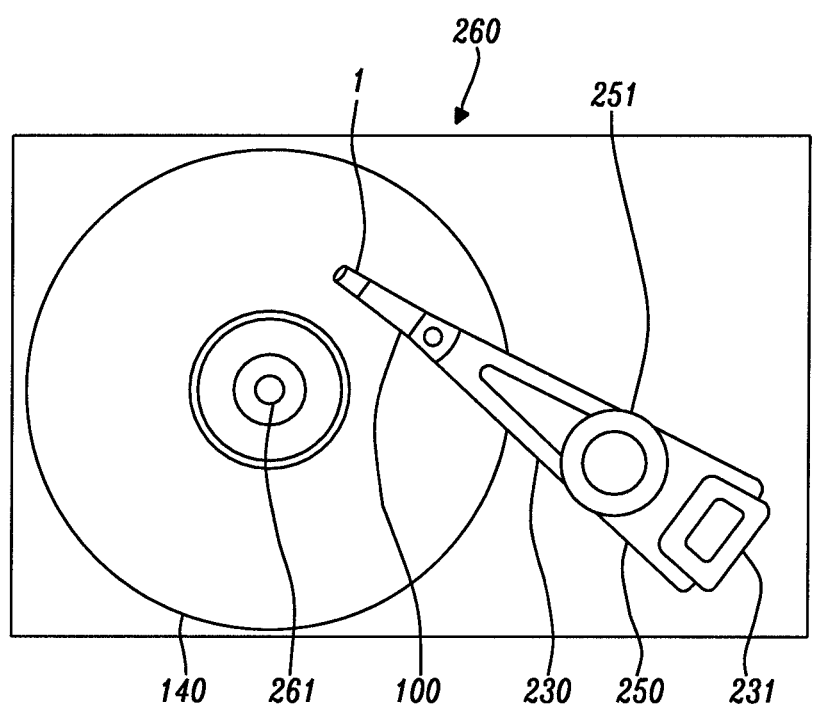
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
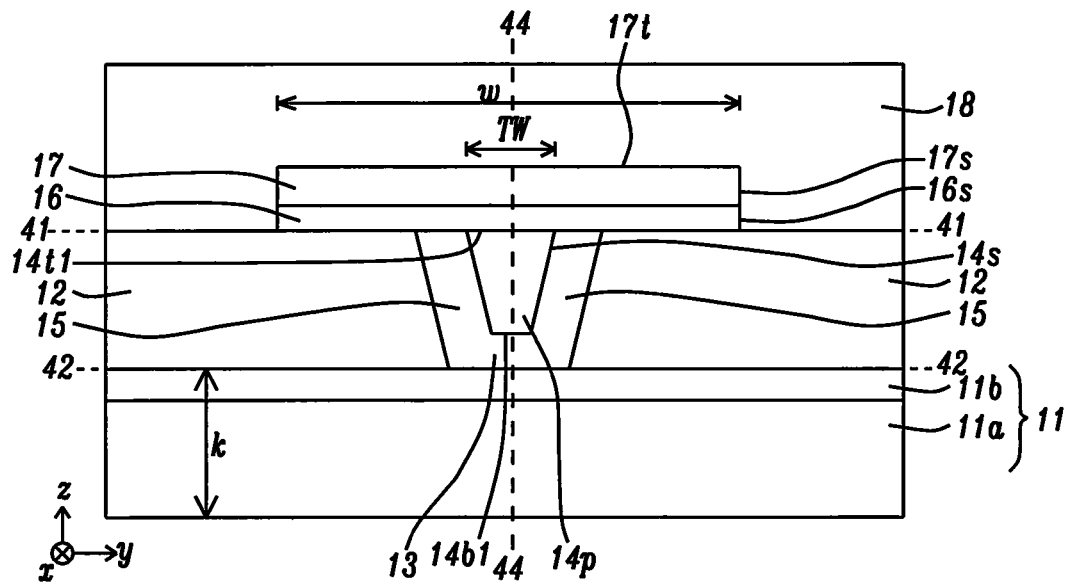
FIG. 4 is an ABS view of a single PMR writer having an all wrap around (AWA) shield design surrounding the main pole according to an embodiment of the present disclosure.

In FIG. 4, an ABS view is illustrated of a PMR writer according to one embodiment of the present disclosure where main pole (MP) tip 14$p$ has track width TW at MP trailing side 14$t$1 that is bisected by center plane 44-44. The main pole tip is shown with a trapezoidal shape but may have different shapes in other embodiments. The MP trailing side at the ABS is formed at plane 41-41 that is orthogonal to the center plane. Write gap (WG) 16 with sides 16$s$, and hot seed (HS) layer 17 also known as the first trailing shield (TS) with sides 17$s$ are sequentially formed on the MP trailing side and each has a width w where w>TW.

In the exemplary embodiment, there is a write shield (WS) 18 also known as the second TS on HS layer 17 and on portions of plane 41-41 not covered by WG 16. Moreover, there is a leading shield (LS) 11 that is typically comprised of a leading edge taper (LET) layer 11$b$ and lower LS layer 11$a$ that are bisected by center plane 44-44. A gap layer surrounds MP tip 14$p$ and is comprised of leading gap 13 that adjoins MP leading side 14$b$1, side gaps 15 contacting each MP side 14$s$, and the WG. Note that the trailing shield structure further includes PP3 trailing shield (TS) 26$a$-26$c$ (FIG. 5A) that forms a magnetic connection between the WS top surface and top surface 36$t$ of TY 36. The front side 26$f$ of the PP3 TS may be exposed at the ABS, or recessed from the ABS in other embodiments (not shown). A side shield (SS) 12 adjoins a side gap on each side of the center plane. Each side shield has a top surface at plane 41-41 and a bottom surface at plane 42-42 that is parallel to plane 41-41 and comprises a bottom surface of the leading gap.

Although the exemplary embodiments relate to a single PMR writer, we described in related application Ser. No. 15/913,167 that a single writer structure shown in FIG. 4 may be duplicated to provide a second writer on a single slider to form a dual PMR writer also referred to as a selectable dual writer (SDW). Similarly, a third writer may be simultaneously formed on an opposite side of the second writer to yield a selectable triple writer (STW). The substrate or slider (not shown) is typically formed in an array of sliders on a wafer. After the combined read/write head structure is completed, the wafer is sliced to form rows of sliders. Each row is typically lapped to afford an ABS before dicing to fabricate individual sliders that are paired with a suspension in a head gimbal assembly (HGA) for a hard disk drive (HDD) application.

Figure 7:
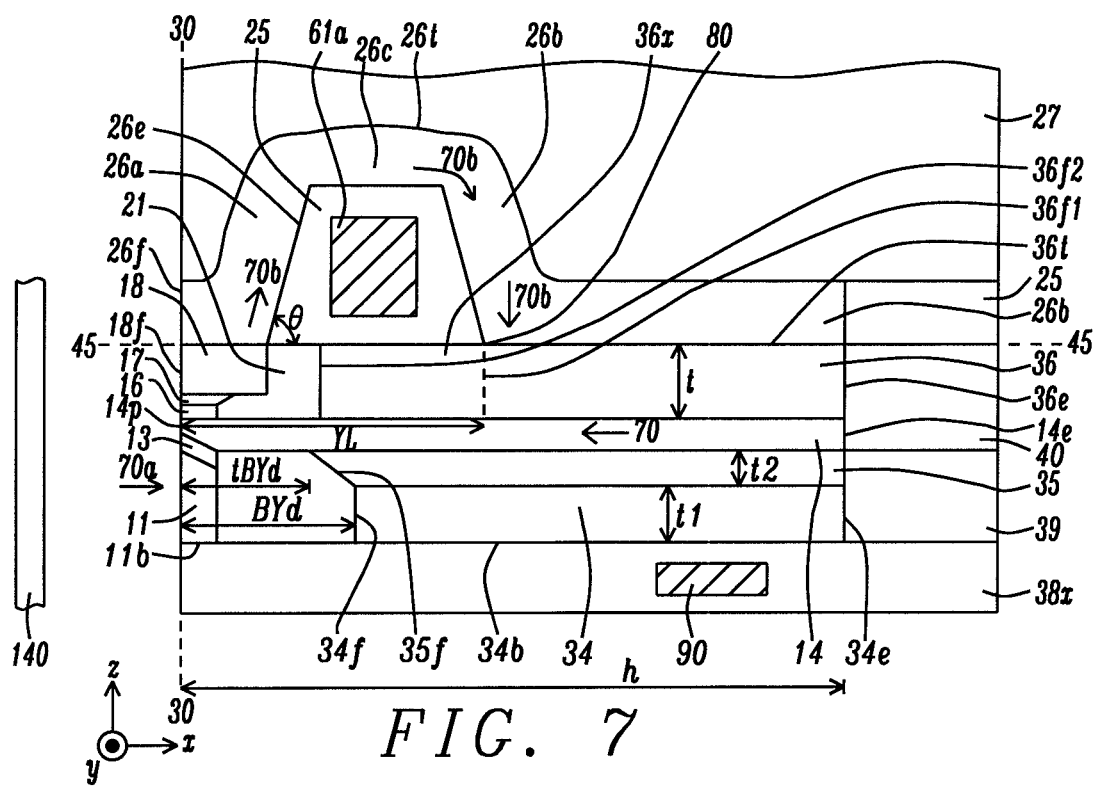
Figure 8:
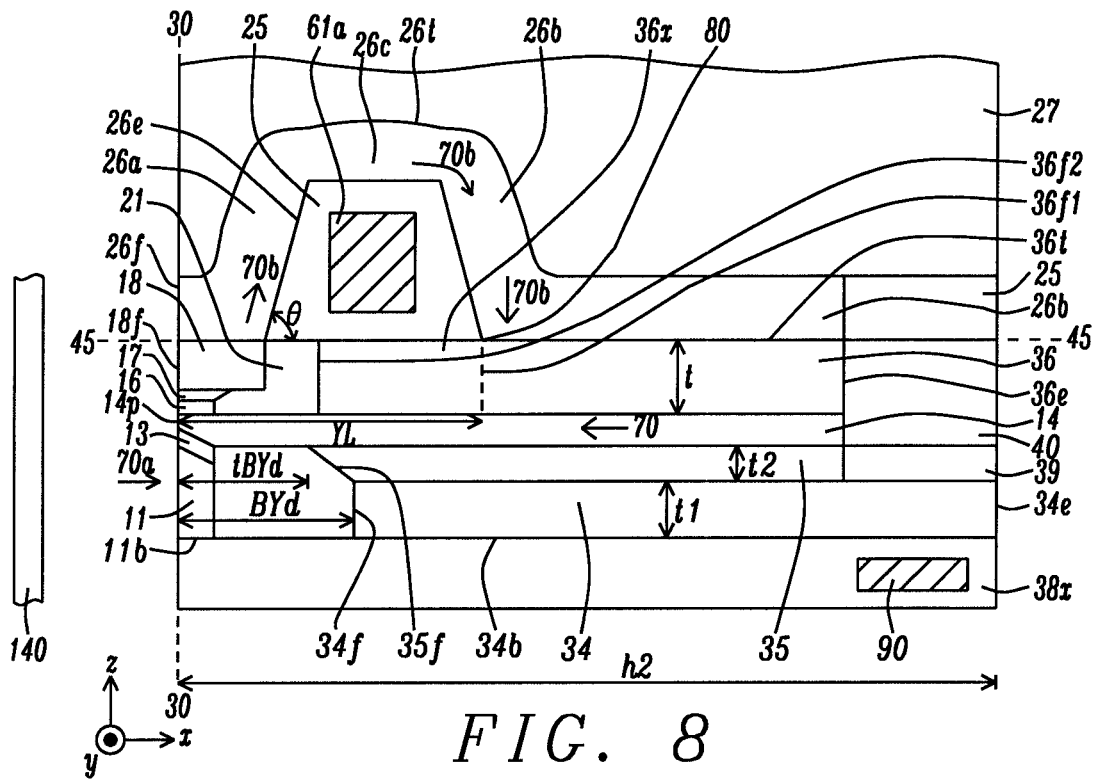
Figure 9:
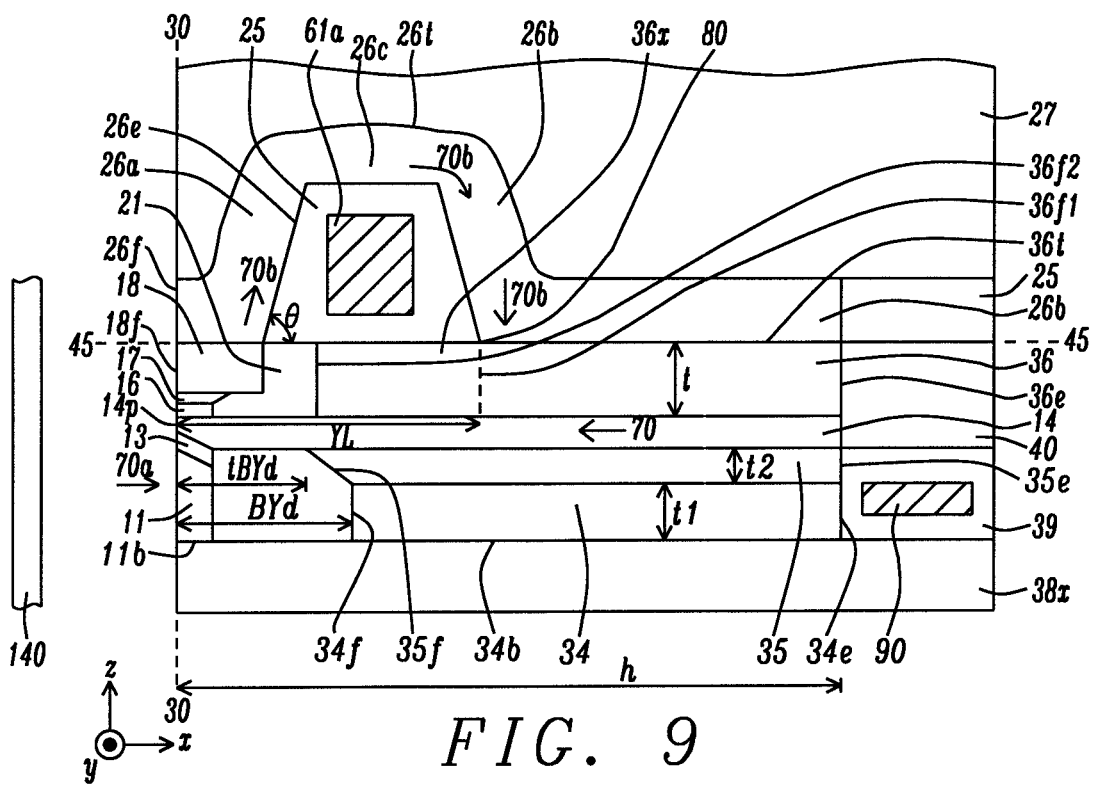
FIG. 9 is a down-track cross-sectional view of a PMR writer according to a fourth embodiment of the present disclosure where the writer structure in FIG. 7 is modified by moving the heater element behind the BY backside.

It should be understood that one or more dynamic fly height (DFH) heaters may be formed in one or more insulation (dielectric) layers in a PMR writer to control the extent of thermal expansion (protrusion) at the ABS and toward a magnetic medium during a read or write process. Read gap (RG) and write gap (WG) protrusion may be tuned by the placement of the one or more DFH heaters, and by the choice of metal or alloy selected for the DFH heaters since each DFH heater is comprised of a resistor material with a particular thermal and mechanical response to a given electrical input. Placement of a DFH heater (heating element) below or behind the BY in the PMR writer will be described according to multiple embodiments of the present disclosure that are depicted in FIGS. 7-9.

Figure 5A:
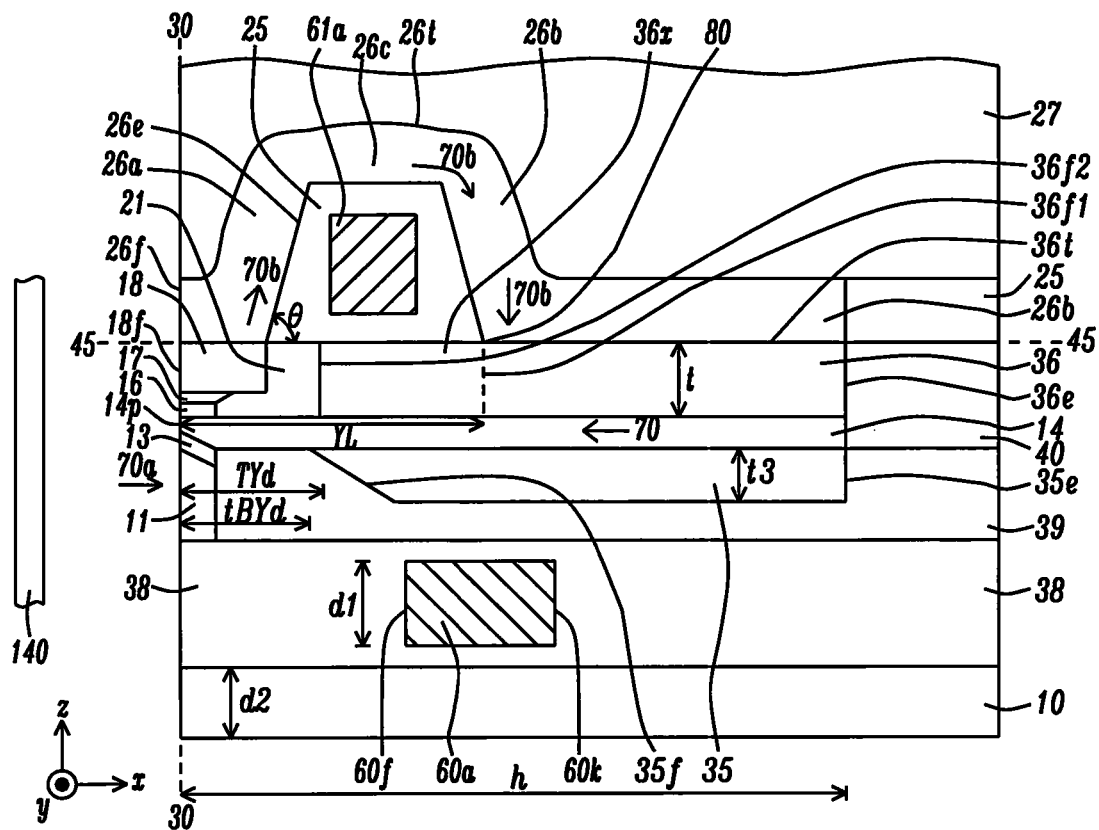
FIG. 5A is a down-track cross-sectional view and FIG. 5B is a top-down view of a PMR writer previously disclosed by the inventors and having a 1+1T coil design in a nDWS base writer scheme with a uDY for the top yoke and a tBY between the MP and bottom coil.

Referring to FIG. 5A, a PMR writer previously disclosed by the inventors in related application Ser. No. 16/254,755 is illustrated. The read head is omitted to simplify the drawing and to focus on the yoke structure, and the trailing loop for magnetic flux 70$b$ return to the MP 14. The down-track cross-sectional view is taken along plane 44-44 in FIG. 4 and represents a nDWS base writer design where the leading loop terminates at LS 11 for magnetic flux 70$a$ return, and the trailing loop includes a uDY scheme for the top yoke comprised of TY 36 with front side 36$f$2, and TY extension 36$x$ having front side 36$f$1 that is at height YL of 2-2.6 microns from ABS 30-30. TY (and TY extension) thickness t is from 0.3-0.8 micron. A key feature is that TYd is less than YL.

The trailing loop comprises HS layer 17, WS 18 with front side 18f at the ABS 30-30, PP3 TS 26a-26c that has front side 26f at the ABS in FIG. 5A, and TY 36 adjoining the PP3 TS behind driving coil 61a so that magnetic flux 70b from magnetic medium 140 is able to return to MP 14. The driving coil is formed above insulation layer 21 and is surrounded on the sides and top and bottom surfaces with insulation layer 25. When a write current (not shown) is applied to the driving coil, magnetic flux (write field 70) is generated in the MP. The PP3 TS top surface 26t arches (dome shape) over the driving coil, and a backside 26e of PP3 inner portion 26a preferably forms an angle θ of from 60 degrees to 80 degrees with plane 45-45 that comprises the TY top surface 36t and the interface of the WS and PP3 TS. The PP3 TS apex angle θ is believed to enhance flux concentration at WS 18 and provides improved high data rate performance. The driving coil is entirely above plane 45-45 and TY extension 36x, and within insulation layer 25.

Magnetic flux 70b flows from the PP3 inner portion 26a to the PP3 center portion 26c above the driving coil, and then to the PP3 back portion 26b that contacts the TY top surface, and finally through the TY to a back portion of MP 14. A protection layer 27 covers the PP3 trailing shield and is made of an insulating material such as alumina. Note that the TY 36 has a thickness t, and extends between a front side 36f1 and backside 36e where the front side is directly below the inner corner 80 of the PP3 back portion. Insulation layer 40 adjoins the TY backside and tBY backside 35e.

The tBY 35 has thickness t3 and a tapered front side 35f with a top end that is recessed to a height tBYd behind the LS 11 and within insulation layer 39 that adjoins a top surface of insulation layer 38 and a bucking coil front portion 60a having thickness d1. Note that a back portion of the bucking coil is not shown, and each of the insulation layers described herein may be comprised of one or more layers. The bucking coil has front side 60f that is recessed from the ABS 30-30 and formed within insulation layer 38 and on bottommost insulation layer 10 with thickness d2 in the write head portion of the PMR writer. Insulation layer 38 is formed between the bucking coil front side 60f and ABS, and also adjoins backside 60k of the bucking coil front portion. Leading shield (LS) 11 has a front side at the ABS. In the exemplary embodiment, tBY backside 35e and TY backside 36e are both at a first height h from the ABS.

Figure 5B:
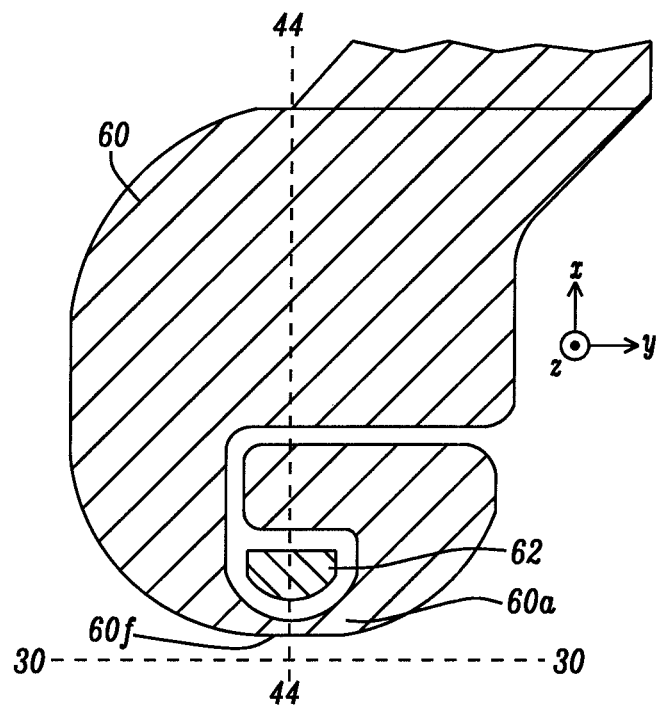

FIG. 5B shows a top-down view of the bucking coil 60 that has front portion 60a and front side 60f, which is recessed from ABS 30-30. Back gap connection 62 is shown according to its placement in a DWS design but is not present in nDWS schemes of the present disclosure.

Figure 6A:
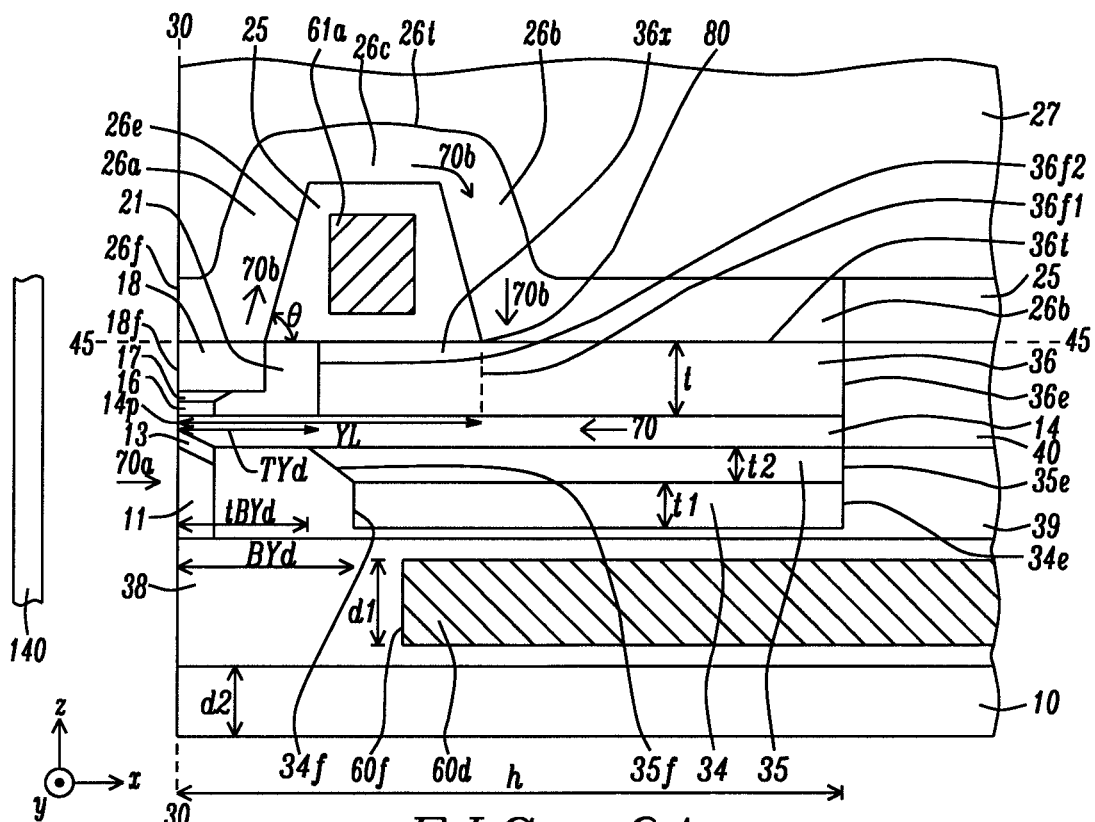
FIG. 6A is a down-track cross-sectional view and FIG. 6B is a top-down view of the PMR writer in FIG. 5A and FIG. 5B, respectively, where a dummy coil replaces the bottom coil to form a 1+0T coil design that is one version of a T1T design according to an embodiment of the present disclosure.

Referring to FIG. 6A, the inventors have discovered that by modifying the PMR writer in FIG. 5A with the insertion of a bottom yoke (BY) 34 that adjoins the bottom surface of tBY 35, faster saturation speed and better HDR performance may be achieved in a 1+1T scheme with the nDWS base writer. Preferably, tBY thickness t2 is from 0.2-0.6 micron, and BY thickness t1 is from 0.7-1.0 micron such that the sum (t1+t2) is up to 2× larger than tBY thickness t3 in FIG. 5A. The tBY front side 35f is recessed to a height tBYd of 0.4-0.8 micron while the BY front side 34f is recessed to a height BYd that is from 0.8-1.2 microns from the ABS 30-30, and where BYd>tBYd. The BY backside 34e may be at the first height h.

The bottom coil 60 with front portion 60a may be retained from FIG. 5A in FIG. 6A to maintain a 1+1T coil design. However, in the exemplary embodiment shown in FIG. 6A, the bottom coil is replaced with a dummy metal layer 60d in what is called a 1+0T scheme that is also considered a first embodiment of a true 1T (T1T) coil design according to the present disclosure. Thus, only driving coil 61a is active (electrically connected) and generates a write field in MP 14 when a write current (Iw) flows through the driving coil. The dummy metal layer (bucking coil) is not electrically connected to a write pad. As a result, the return field to the trailing loop is substantially enhanced and provides a better trailing field gradient and improved HDR performance. One benefit of the T1T coil design according to the first embodiment is that the existing DFH heater design (not shown) may be applied to satisfy the thermal/mechanical (T/M) requirement.

Figure 6B:
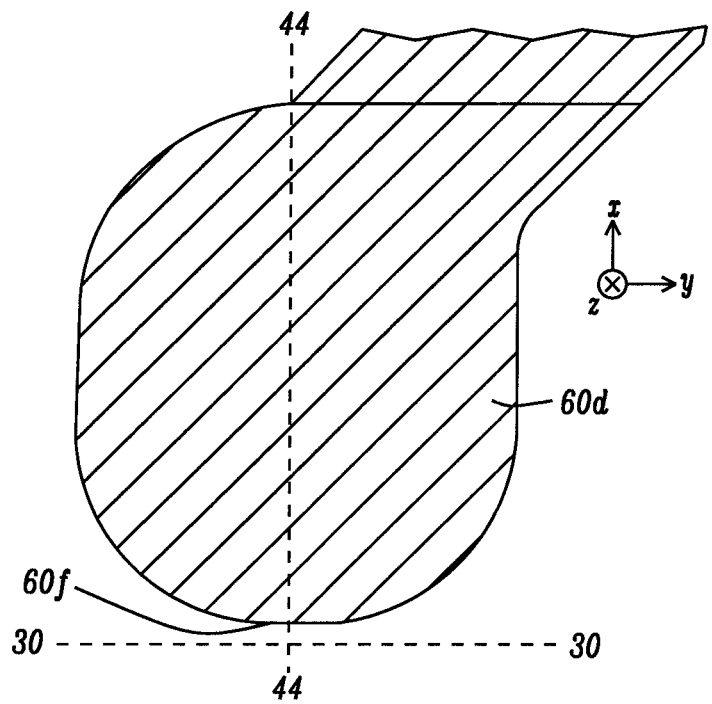

Referring to FIG. 6B, a top-down view of the dummy bucking coil 60d from FIG. 6A is shown with all other layers removed. The general shape of bucking coil 60 in FIG. 5A is maintained except there are no turns. Dummy bucking coil front side 60f is recessed from the ABS 30-30.

According to a second embodiment of the present disclosure shown in FIG. 7, the dummy bucking coil 60d in FIG. 6A is removed while the one turn driving coil 61a is retained to provide a true 1T (T1T) writer design that offers additional benefits over the embodiment in FIG. 6A. For example, reader-writer separation (RWS) is reduced from around 5 microns in the 1+1T design (FIG. 5A) or the 1+0T design (FIG. 6A) to 3-4 microns in the T1T scheme of the second embodiment, and HDD format efficiency is improved accordingly. In particular, insulation layer 10 (thickness d2 in FIG. 6A) that contains the RTP in a DWS scheme is removed, and insulation layer 38 thickness may be considerably reduced by about 1 micron to 1.8 micron (d1 in FIG. 6A) with the removal of the dummy bucking coil to provide insulation layer 38x.

Removal of the bucking coil also greatly enhances the return field 70b to the trailing loop. BY thickness t2 is adjusted to satisfy the HDR requirement for best saturation speed and HDR performance. The tBY 35 and BY 34 have a height tBYd and BYd, respectively, described previously, and each has a backside 35e and 34e, respectively, at the first height h. Thicknesses t1 and t2 are also retained from the FIG. 6A structure. The BY may be comprised of a HD material having a damping parameter ≥0.04, and with a Ms proximate to 12 kG such as FeNiRe, FeNiM, FeNM, or FeCoM where M is a 3d, 4d or 5d transition metal that was described in related U.S. Pat. No. 9,466,319. In alternative embodiments, the BY is one of FeNi, FeCo, or FeCoNi with a Ms from 16 kG to 24 kG. In some embodiments, the BY bottom surface 34b and LS bottom surface 11b are both formed on insulation layer 38x. However, in other embodiments (not shown), one or both of the BY bottom surface and LS bottom surface may be separated from insulation layer 38x by a bottom portion of insulation layer 39.

The WS 18, PP3 TS 26a-26c, TY 36, and TY extension 36x are typically made of NiFe, CoFe, CoFeNi, or CoFeN having a magnetic saturation (Ms) value of 10 kiloGauss (kG) to 19 kG while HS layer 17 and MP 14 have a Ms from 19 kG to 24 kG. SS 12 and LS 11 are generally made of NiFe, CoFe, CoFeN, CoFeNi or the like with a saturation magnetization (Ms) value of 4 kiloGauss (kG) to 16 kG. In this scheme, tBY 35 may be made of the same material as the MP and plated with the MP to simplify the fabrication process. The saturation speed and HDT performance are enhanced as the sum (t1+t2) increases. To reach the optimum trailing return field 70b for the best ADC resulting from higher BPI without degrading TPI, LS 11 is preferably a HD material with a Ms from 4 kG to 12 kG, and having a thickness (k in FIG. 4) from 0.15-1.0 micron, and a height e from 0.15-0.35 micron. In a preferred embodiment, the MP has a backside 14e at height h.

Those skilled in the art will recognize that side track erasure (STE) and WATE will suffer as a consequence of removing bucking coil 60a. This condition may be at least partially mitigated by employing a HD material in one or more of the LS 11, WS 18, and BY 34, or using a funnel TS (FTS) design in the WS that was described in related U.S. Pat. No. 9,990,942 where a HD material is at the sides of the WS while a 16-24 kG material is in a center portion of the WS above the HS layer 17. Furthermore, as the sum (t1+t2) increases, TY thickness t may be reduced from a typical 0.5 micron to about 0.3 micron for more WATE margin when the WS is made completely of a HD material or has the FTS design. A lower IAD pick also referred to as Iw0-pk may also offset undesirable STE and WATE from the WS and PP3 TS as a result of a higher (t1+t2).

The T1T scheme of the second embodiment of the present disclosure necessitates a new DFH heater placement in the write head structure. As shown in FIG. 7, the DFH heater 90 may be formed in insulation layer 38x that is between insulation layer 39 and the read head structure (not shown). Note that insulation layer 38x replaces the stack of insulation layers 10/38 in the prior art shown in FIG. 5A or in the first embodiment (FIG. 6A). The DFH heater is below BY 34 in the exemplary embodiment, and at a height less than the first height h from the ABS 30-30.

Referring to FIG. 8, a third embodiment of the present disclosure is depicted where the nDWS writer structure in FIG. 7 is retained except the BY backside 34e is extended to a second height (h2) from the ABS 30-30 where h2>h. The tBY backside 35e may remain at the first height h. A second important feature is the position of DFH heater 90 in insulation layer 38x and below a back portion of the BY between the first height and the second height.

Referring to FIG. 9, a fourth embodiment of the present disclosure is illustrated where the nDWS writer scheme in FIG. 7 is maintained except the DFH heater 90 is moved behind BY backside 34e and within insulation layer 39. Thus, the DFH heater is between the first height and the second height.

In all of the embodiments shown in FIG. 6A and FIGS. 7-9, there is a single PMR writer. However, the present disclosure also encompasses a dual PMR writer (SDW) or triple PMR writer (STW). When two or more PMR writers (not shown) are formed on a slider, each writer may be fully separated from an adjacent writer with a separate PP3 TS 26a-26c, HS layer 17, WS 18, and LS 11, as well as having a separate MP 14, tBY 35, BY 34, TY extension 36x, and TY 36. In another embodiment (not shown), the two or more writers may share a PP3 TS, WS, and LS, but have a separate HS layer, tBY, BY, TY extension, TY, and MP. In yet another embodiment, all magnetic components in the writer structure are shared except for the tBY, BY, MP, TY extension, and TY.

Figure 10:
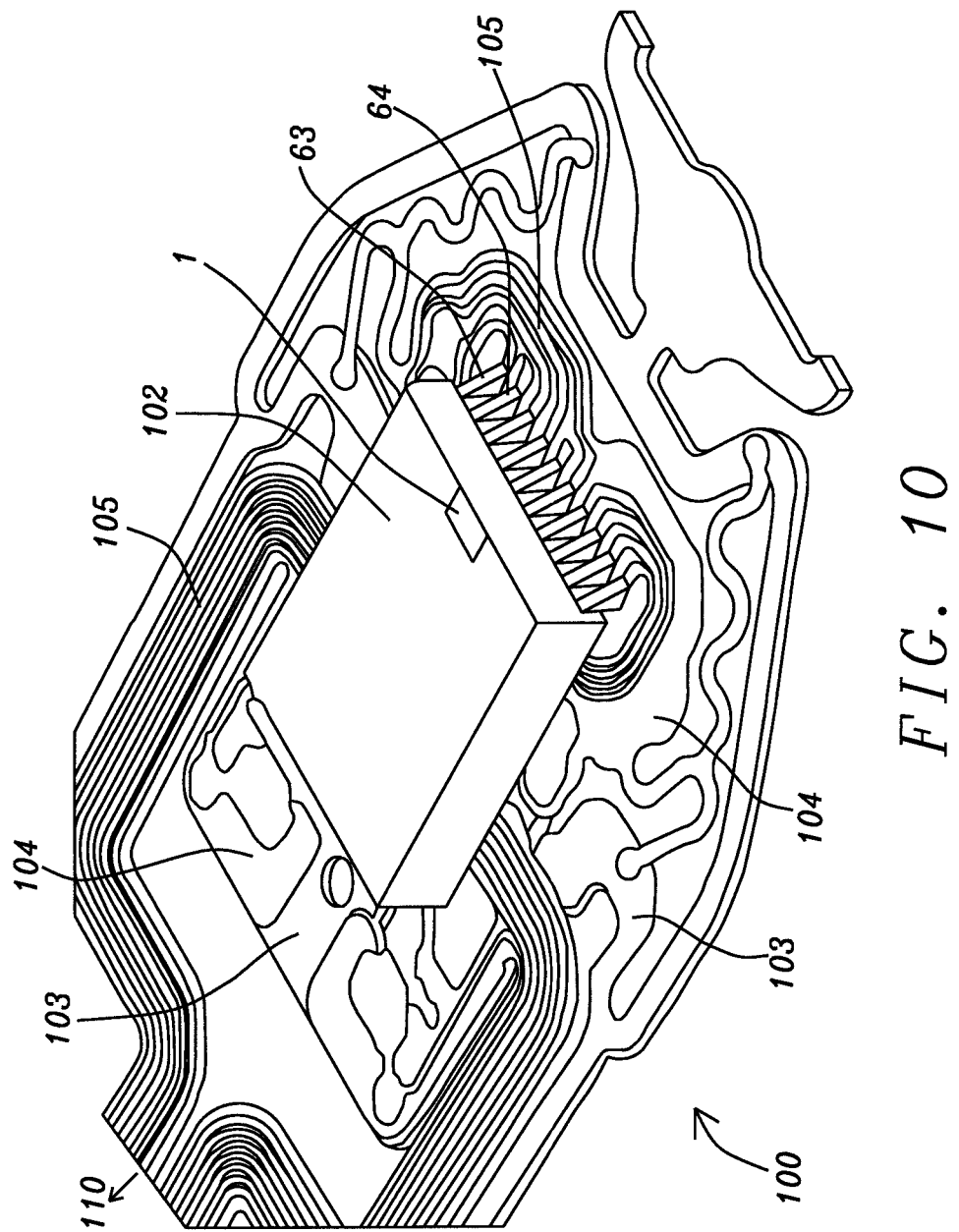
FIG. 10 is an oblique view of a slider on which a combined read/write head structure is mounted, and having adjoining pads and trace lines (wiring) formed on a suspension according to an embodiment of the present disclosure.

Referring to FIG. 10, HGA 100 is depicted and features suspension 103, an overlying dielectric layer 104, and slider 102 formed thereon. A combined read/write head 1 comprised of a PMR writer of the present disclosure adjoins a top side of the slider facing away from the suspension. The suspension is supported using an actuator arm that is driven by an actuation motor to sweep the suspension and slider across the surface of a recording disk as described previously with regard to FIG. 1. A plurality of pads including pads 63, 64 are employed to control a current to the driving coil, DFH heaters, one or more sensors, and one or more readers in the combined read/write head. Connections between the pads and the PMR writer components are within the slider and not visible from this view. The same fabrication scheme used to build a single writer may be employed to fabricate SDW or STW structures of the present disclosure so that no additional product cost is incurred.

Figure 11:
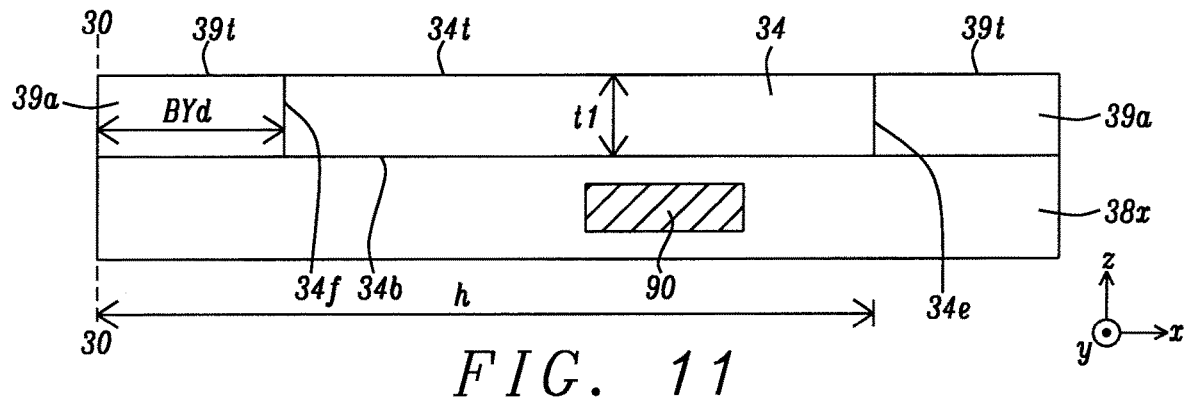
FIG. 11 is a down-track cross-sectional view showing a step where the BY is formed in a first insulation layer, and has a front side recessed to a height BYd from the ABS plane according to an embodiment of the present disclosure.

Key features of fabricating a BY 34, tBY 35, and MP 14 in a PMR writer according to the present disclosure are depicted in FIGS. 11-17. Fabrication of the trailing loop including HS layer 17, WS 18, PP3 TS 26a-26c, TY extension 36x, and TY 36 are provided in related application Ser. No. 16/254,755, and will not be described herein. Referring to FIG. 11, a down-track cross-sectional view is illustrated after first insulation layer 38x with DFH heater 90 is formed therein using conventional process steps. BY 34 with thickness t1 is plated on the first insulation layer, and within a photoresist mask opening (not shown), and has a front side 34f at a BYd height from eventual ABS plane 30-30, and a backside 34e at first height h. Thereafter, the photoresist mask is removed and second insulation layer 39a is deposited on the first insulation layer. A chemical mechanical polish (CMP) process is employed to form a BY top surface 34t that is coplanar with second insulation layer top surface 39t.

Figure 12:
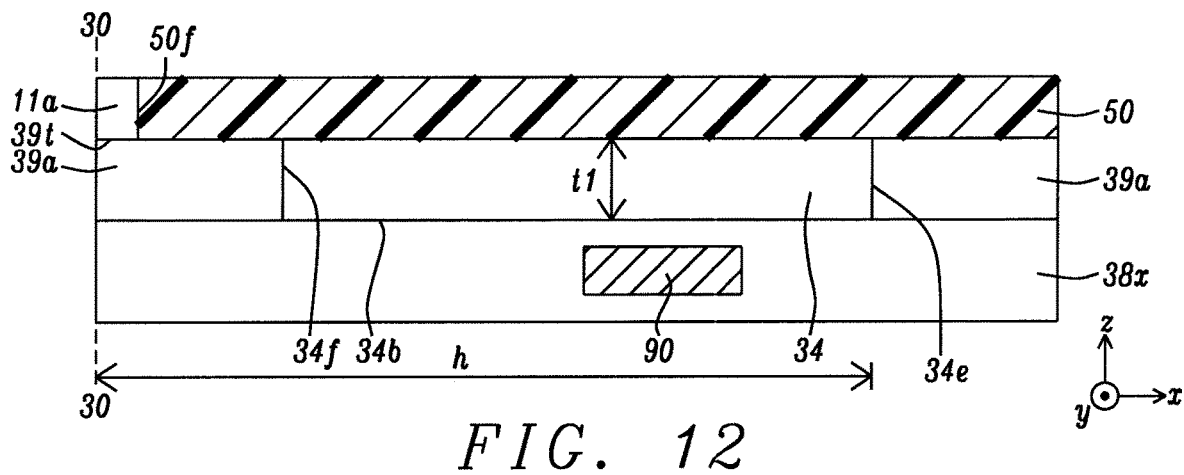
FIGS. 12-13 are down-track cross-sectional views showing a step of forming a leading shield (LS) on the first insulation layer at the ABS plane, and then forming a leading edge taper (LET) layer on the LS, respectively, according to an embodiment of the present disclosure.

In FIG. 12, photoresist mask 50 is formed on the second insulation layer 39a with a conventional photolithography process, and has a front side 50f that exposes a portion of second insulation layer top surface 39t proximate to the ABS plane 30-30. LS 11a is then plated on the exposed portion of second insulation layer top surface between the ABS plane and the photoresist mask front side. It should be understood that the layers shown at the ABS plane typically continue to the left of the ABS plane and are not removed until a lapping process at the end of the fabrication sequence.

Figure 13:
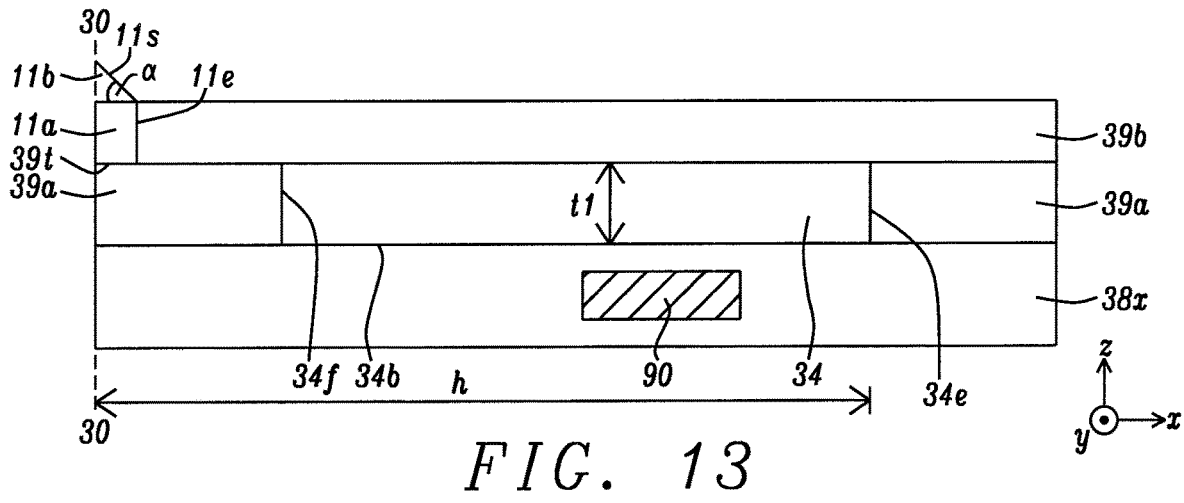

Referring to FIG. 13, photoresist mask 50 is removed and third insulation layer 39b is deposited on second insulation layer top surface 39t, and has a thickness essentially equal to that of LS 11a after a second CMP is performed. All insulation layers in the PMR writer may be comprised of one or more dielectric materials including alumina, silica, and other metal oxides, or metal nitrides used in the art. Next, LET 11b is formed on LS 11a using a process sequence that was previously described in related U.S. Pat. No. 10,014,021 (FIGS. 9B-10), and has tapered side 11s extending from ABS plane 30-30 to LS backside 11e, and with taper angle α. Next the side shields (not shown) are plated according to a conventional method.

Figure 14:
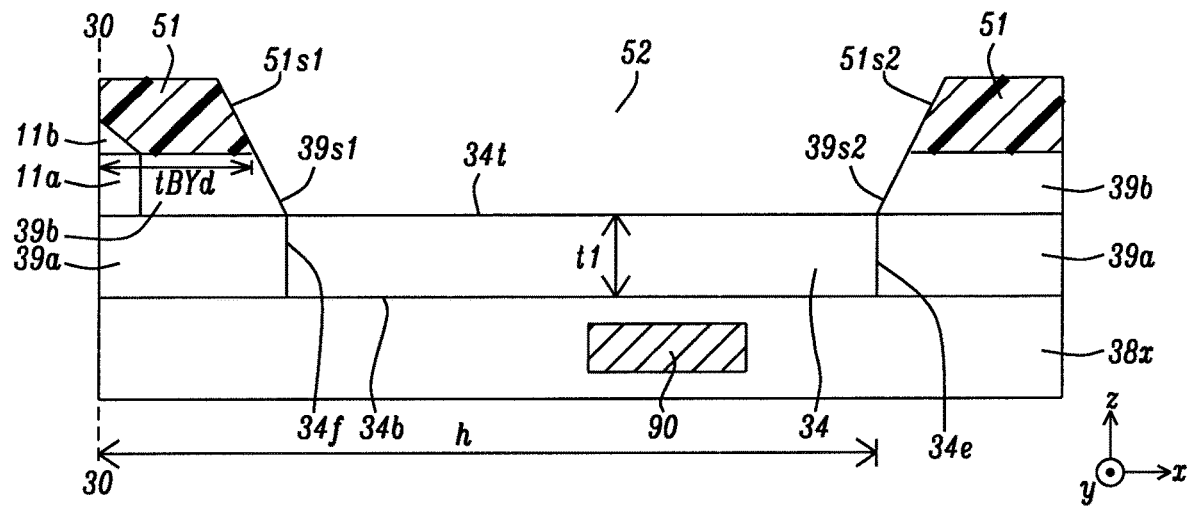
FIGS. 14-15 are down-track cross-sectional views depicting the steps of forming an opening in a second insulation layer above the BY that exposes a BY top surface, and then depositing a gap layer on the LET, second insulation layer, and BY top surface according to an embodiment of the present disclosure.

Referring to FIG. 14, photoresist mask 51 with opening 52 is formed on third insulation layer 39b using a well known photolithography technique. The opening has a tapered front side 51s1 that determines the tBYd height when the tBY is plated in a subsequent step, and has a backside 51s2. Thus, a front portion of the photoresist mask extends from ABS plane 30-30 to the tapered front side. A RIE process is employed to transfer the opening through exposed portions of the third insulation layer and stops on BY top surface 34t thereby forming tapered sidewalls 39s1, 39s2 (extensions of sidewalls 51s1, 51s2, respectively) on the third insulation layer.

Figure 15:
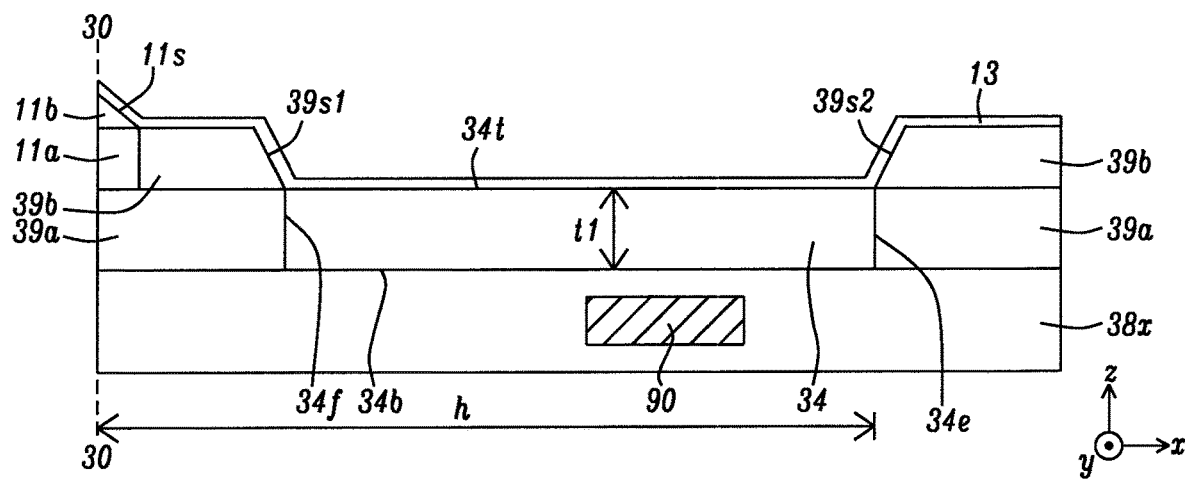

With regard to FIG. 15, after photoresist mask 51 is removed, a gap layer comprised of leading gap 13 and the SG (not shown) is deposited on LET 11b, and the side shields, respectively. The leading gap also covers third insulation layer 39b and BY top surface 34t.

Figure 16:
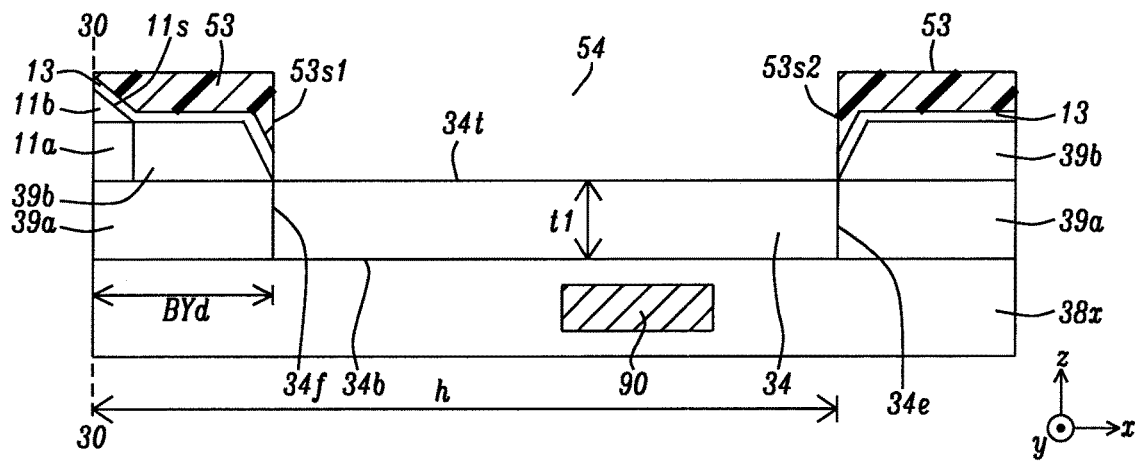
FIG. 16 is a down-track cross-sectional view showing a process of removing the second insulation layer above the BY top surface according to an embodiment of the present disclosure.

Referring to FIG. 16, photoresist mask 53 is formed on leading gap 13 and the SG (not shown) and opening 54 is formed therein and above BY top surface 34*t* with a conventional photolithography method. Preferably, a front photoresist sidewall 53*s*1 is proximate to the BYd height, and a back photoresist sidewall 53*s*2 is above the BY backside 34*e*. Thereafter, an IBE process is used to remove the leading gap on BY 34 and stops on BY top surface 34*t*.

Figure 17:
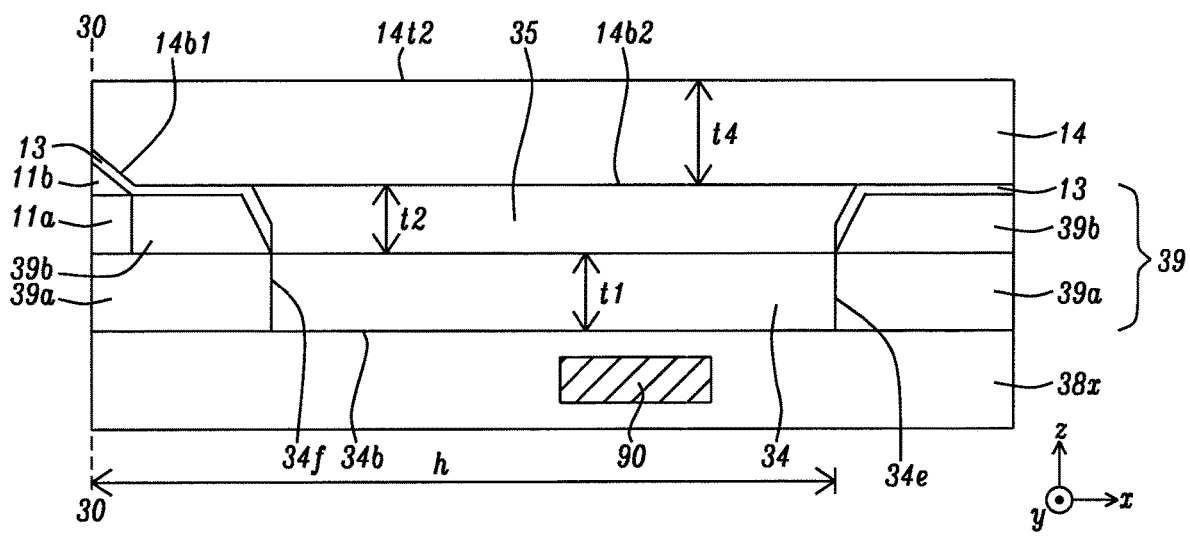
FIG. 17 is a down-track cross-sectional view depicting the partially formed PMR writer after depositing the tapered BY (tBY) on the BY top surface, and the overlying MP on the gap layer and tBY top surface according to an embodiment of the present disclosure.

FIG. 17 depicts the partially formed PMR writer after photoresist mask 53 is removed, and then a magnetic material with thickness (t2+t4) is plated on BY top surface 34*t* to form tBY 35 (t2 thickness) and overlying MP 14 (t4 thickness). MP bottom surface 14*b*2 is on LG 13 above third insulation layer 39*b*, and also adjoins a top surface of the tBY at thickness t2 above the BY top surface. MP top surface 14*t*2 is a thickness t4 above the MP bottom surface. MP tapered leading side 14*b*1 is above LET 11*b*. At this point, a MP tapered trailing side 14*t*1 (FIG. 4) may be formed by etching away a front portion of MP top surface 14*t*2 from the ABS plane to a throat height (not shown) with a sequence of steps well known in the art and not described herein.

Thereafter, a process sequence described in related application Ser. No. 16/254,755 is followed to complete the PMR writer and includes forming a trailing loop with HS layer 17, WS 18, PP3 TS 26*a*-26*c*, TY 36, TY extension 36*x*, and driving coil 61*a* as shown in the embodiments depicted in FIGS. 7-9. Finally, a lapping process is employed to form ABS 30-30 as appreciated by those skilled in the art.

While the present disclosure has been particularly shown and described with reference to, the preferred embodiments thereof, it will be understood by those skilled in the art that various changes in form and details may be made without departing from the spirit and scope of this disclosure.

I claim:

1. A perpendicular magnetic recording (PMR) writer configured in a true one turn (T1T design); comprising:
   (a) a main pole layer (MP) that has a MP tip at an air bearing surface (ABS), a top surface contacting a bottom surface of a top yoke (TY), and a bottom surface adjoining a top surface of a tapered bottom yoke (tBY);
   (b) the TY with a front side that is recessed from the ABS, and a top surface;
   (c) a one turn driving coil formed between the MP and a trailing shield structure and entirely above a plane that comprises the TY top surface, wherein the one turn driving coil is the only active coil that is electrically connected to a pad;
   (d) the trailing shield structure comprised of a hot seed (HS) layer and overlying write shield (WS) at the ABS, and an uppermost (PP3) trailing shield (TS) with a middle portion formed over the one turn driving coil, and wherein the PP3 TS has a front portion that contacts a top surface of the WS, and a back portion that adjoins the TY top surface;
   (e) the tBY wherein a top end of a front side thereof is at a first height (tBYd) from the ABS, and a backside is at a second height (h) from the ABS; and
   (f) a bottom yoke (BY) that adjoins a bottom surface of the tBY, and has a front side at a third height (BYd) from the ABS where BYd>tBYd.

2. The PMR writer of claim 1 further comprising a TY extension adjoining the TY front side, and wherein the TY extension is formed below the one turn driving coil.

3. The PMR writer of claim 1 wherein the tBY has a thickness that is from 0.2 micron to 0.6 micron, and the BY has a thickness from 0.7 micron to 1.0 micron.

4. The PMR writer of claim 1 wherein tBYd is from 0.4 micron to 0.8 micron and BYd is from 0.8 micron to 1.2 microns.

5. The PMR writer of claim 1 wherein the PMR writer has a non-dual write shield (nDWS) design wherein a leading loop for magnetic flux return from a magnetic medium to the MP is terminated at a leading shield.

6. The PMR writer of claim 5 wherein the tBY and BY are formed behind the leading shield and separated therefrom by a first insulation layer.

7. The PMR writer of claim 6 wherein the BY has a backside at the second height, and the PMR writer further comprises a dynamic fly height (DFH) heater formed in a second insulation layer below the BY and first insulation layer, and at a height less than the second height from the ABS.

8. The PMR writer of claim 6 wherein the BY has a backside at a fourth height (h2) from the ABS that is greater than h, and wherein the PMR writer further comprises a DFH heater that is formed in a second insulation layer below the BY and first insulation layer, and at a height greater than h but less than h2.

9. The PMR writer of claim 6 wherein the BY has a backside at the second height, and the PMR writer further comprises a DFH heater formed in the first insulation layer, and at a height greater than h from the ABS.

10. The PMR writer of claim 6 further comprised of two side shields each contacting a bottom surface of the WS on opposites sides of the MP, and wherein the leading shield and the side shields are a high damping material with a damping parameter ≥0.04, and with a magnetization saturation from 4-12 kiloGauss.

11. The PMR writer of claim 1 further comprised of a dummy bucking coil formed in an insulation layer below the BY, and wherein the dummy bucking coil is a metal layer that is not electrically connected to a pad.

12. The PMR writer of claim 1 wherein the WS is comprised of a high damping material with a damping parameter ≥0.04 in side portions thereof while a 16-24 kiloGauss material is in a center portion of the WS above the HS layer.

13. The PMR writer of claim 1 wherein the WS is a high damping material having a damping parameter ≥0.04.

14. The PMR writer of claim 1 wherein the BY is comprised of a high damping material with a damping parameter ≥0.04, and having a magnetization saturation (Ms) proximate to 12 kiloGauss, or is one of FeNi, FeCo, or FeCoNi with a Ms from 16-24 kiloGauss.

15. A head gimbal assembly (HGA) comprising:
   (a) the PMR writer of claim 1; and
   (b) a suspension that elastically supports the PMR writer, wherein the suspension has a flexure to which the PMR writer is joined, a load beam with one end connected to the flexure, and a base plate connected to the other end of the load beam.

16. A magnetic recording apparatus, comprising:
   (a) the HGA of claim 15;
   (b) a magnetic recording medium positioned opposite to a slider on which the PMR writer is formed;
   (c) a spindle motor that rotates and drives the magnetic recording medium; and
   (d) a device that supports the slider, and that positions the slider relative to the magnetic recording medium.

* * * * *